(12) United States Patent
Wood

(10) Patent No.: US 7,036,769 B2
(45) Date of Patent: May 2, 2006

(54) MICROSTRUCTURES USING CARBON FIBER COMPOSITE HONEYCOMB BEAMS

(75) Inventor: Robert Wood, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/830,374

(22) Filed: Apr. 22, 2004

(65) Prior Publication Data

US 2006/0006280 A1 Jan. 12, 2006

Related U.S. Application Data

(60) Provisional application No. 60/470,456, filed on May 14, 2003.

(51) Int. Cl.
*B64C 244/11* (2006.01)
(52) U.S. Cl. .............................. 244/11; 244/22; 244/72; 310/323.01; 310/328; 446/35
(58) Field of Classification Search .................. 244/11, 244/22, 72; 310/323.01, 323.02, 328; 446/35
See application file for complete search history.

(56) References Cited

U.S. PATENT DOCUMENTS 5,443,884 A * 8/1995 Lusignea et al. ............ 428/116
5,596,240 A * 1/1997 Suganuma ............. 310/323.05
5,654,604 A * 8/1997 Ashizawa et al. ..... 310/323.03
5,942,838 A * 8/1999 Lee et al. .................... 310/333
6,082,671 A * 7/2000 Michelson .................... 244/72
6,550,716 B1 * 4/2003 Kim et al. ..................... 244/11
6,632,310 B1 * 10/2003 Freeman et al. ............ 156/182
6,802,473 B1 * 10/2004 Charron ....................... 244/11
6,824,094 B1 * 11/2004 Richard ....................... 244/11
2004/0221648 A1 * 11/2004 Wu et al. ................. 73/504.02

OTHER PUBLICATIONS

Yan J. et al.; "Towards Flapping Wing Control for a Micromechanical Flying Insect"; Dept. of EECS, University of California, Berkeley, CA 94720.
Goldfarb, M. et al.; "A Well-Behaved Revolute Flexure Joint for Compliant Mecahnism Design"; Journal of Mechanical Design; vol. 121, p. 424-429; Sep. 1999.

* cited by examiner

*Primary Examiner*—J. Woodrow Eldred
(74) *Attorney, Agent, or Firm*—John W. Carpenter; Trellis Intellectual Property Law Group, PC

(57) ABSTRACT

A drive assembly for a wing of a micromechanical flying insect. The drive assembly comprises a honey comb structure. A method for flying a micromechanical flying insect comprising moving a wing with a drive assembly having a stiffness to weight ratio greater than about $16 \times 10^{10}$ N/mKg.

13 Claims, 13 Drawing Sheets

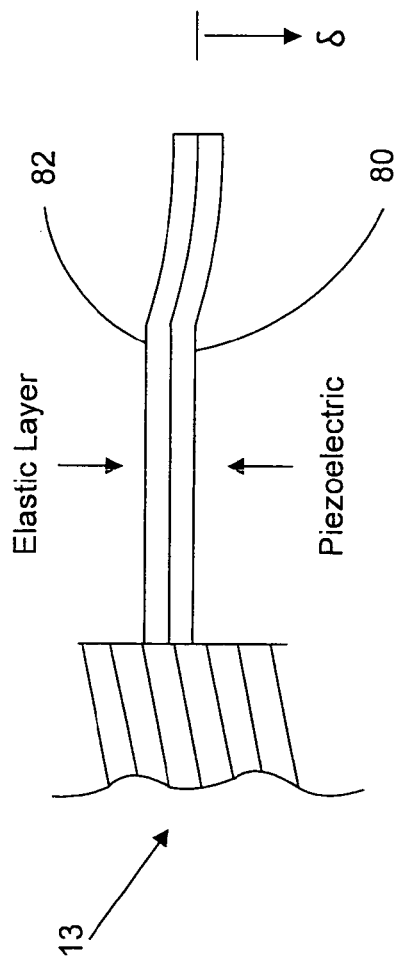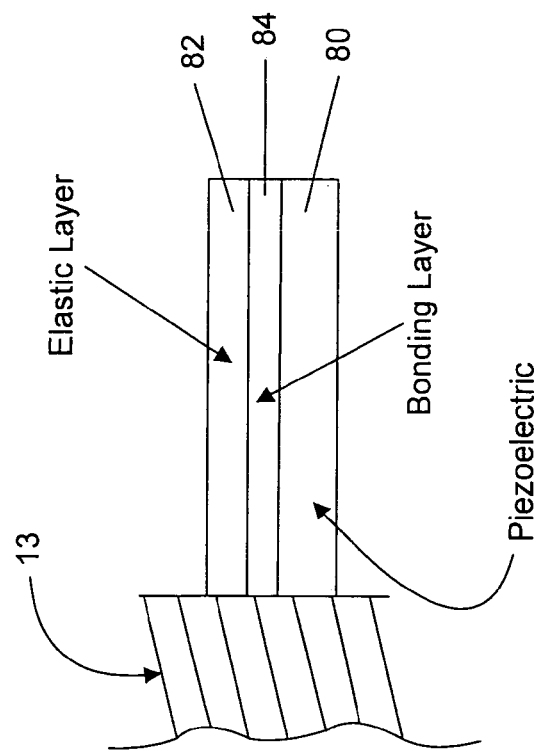
Fig. 11
Fig. 12

Twist angle as a function of ply angle (deg)

End-on view of actuator through one complete cycle

MICROSTRUCTURES USING CARBON FIBER COMPOSITE HONEYCOMB BEAMS

This application claims the benefit of U.S. Provisional Application 60/470,456, filed May 14, 2003, and fully incorporated herein by reference thereto.

ACKNOWLEDGMENT OF GOVERNMENT SUPPORT

This invention was made with Government support under Grant (Contract) No. ECS-9873474 awarded by NSF, and N00014-98-1-0671 awarded by ONR MURI. The Government has certain rights to this invention.

BACKGROUND OF THE INVENTION

1. Field of the Invention

This invention is related in general to micromechanical flying insect (MFI) devices. More specifically, embodiments of the present invention provide a drive assembly for a wing of a MFI.

2. Description of the Background Art

Micro flapping structures such as are used in the MFI are required to produce large displacements at high resonant frequencies, while performing complex kinematic patterns. The MFI wings must be capable of independently going through a wing stroke of 120°, while being able to rotate 90° at a resonant frequency of 150 Hz. To do this, the body of the MFI includes actuators, two wings, each driven by separate thorax structures. The thorax structures consist of actuators, mechanically amplifying four-bar structures, and a differential. Since the work done on the air is proportional to the velocity of the wing squared, an important requirement is a high resonant frequency. Conventional MFI thorax is produced by using stainless steel beams as the structural members and polymer flexures to act as joints. This has drawbacks of having high inertias, thus lowering the resonant frequency, as well as being difficult to construct.

SUMMARY OF EMBODIMENTS OF THE INVENTION

Embodiments of the present invention also provide a drive assembly for a wing of a micromechanical flying insect. The drive assembly includes a honey comb structure, and an actuator including a piezoelectric material and a bonding layer. The actuator comprises a single crystal piezoelectric or an amorphous piezoelectric layer.

Embodiments of the present invention further also provide a method for flying a micromechanical flying insect comprising moving a wing with a drive assembly having a stiffness to weight ratio greater than about $16 \times 10^{10}$ N/mKg. The drive assembly comprises a honeycomb structure.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

BRIEF DESCRIPTION OF THE DRAWINGS

FIG. 11 is a vertical sectional view of the layers for the actuators.

FIG. 12 is another vertical sectional view of the layers for the actuators.

DETAILED DESCRIPTION OF EMBODIMENTS OF THE INVENTION

Figure 1:
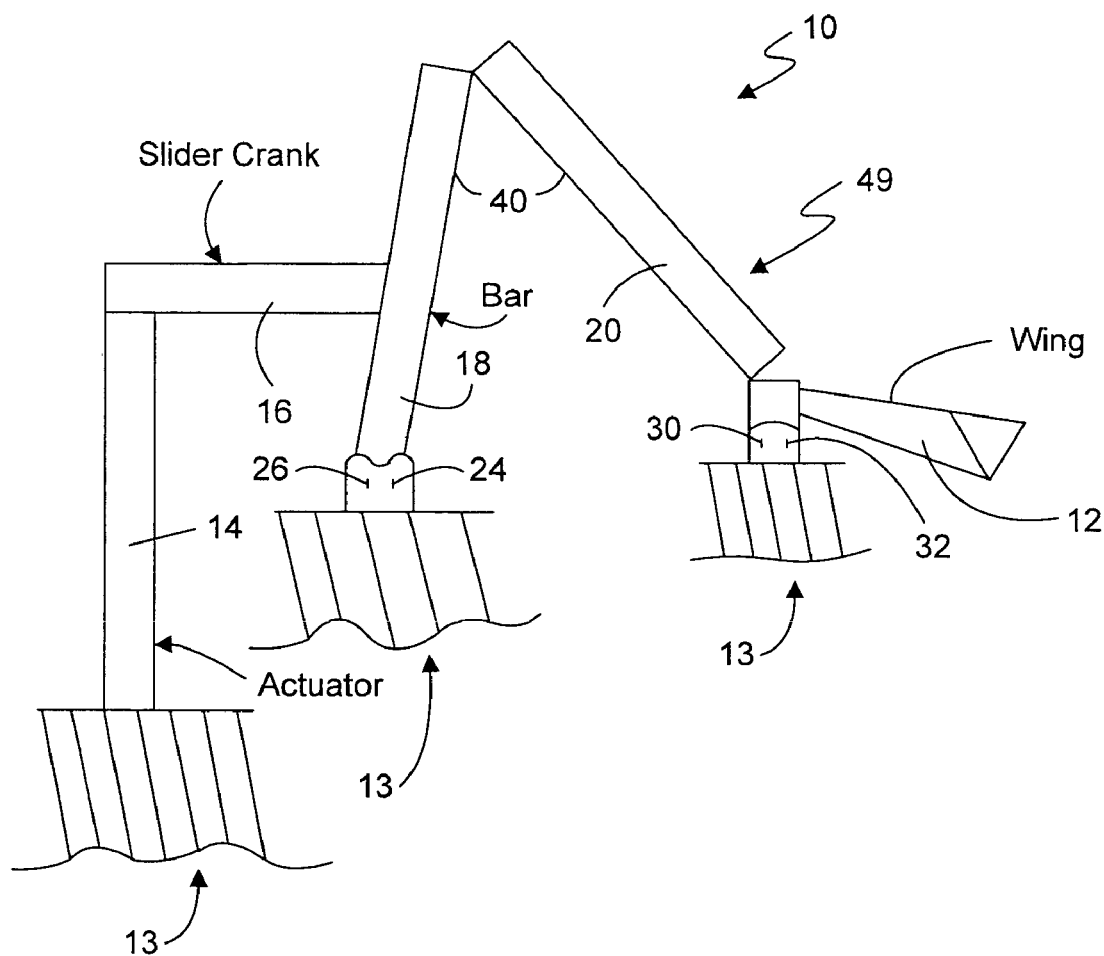
FIG. 1 is a schematic diagram of an embodiment of a driving assembly for a wing of an MFI.

Referring now to FIG. 1 there is seen a drive assembly, generally illustrated as 10, for a wing 12 of an MFI, generally illustrated as 11. The drive assembly 10 is supported by an airframe, generally illustrated as 13 in FIG. 4. The drive assembly 10 includes a four (4) bar linkage assembly, generally illustrated as 49 in FIG. 1. The links or bars of the structure in FIG. 1 are constructed using a manufacturing process involving uncured fibers pre-impregnated with epoxy, a laser micromachining system, and two dimensional computer aided design software. It is desired that these links be machined down to feature sizes of 50 μm while comprising a material of Young's modulus greater than 200 GPa and density of less than 2000 kg/m³.

Figure 3B:
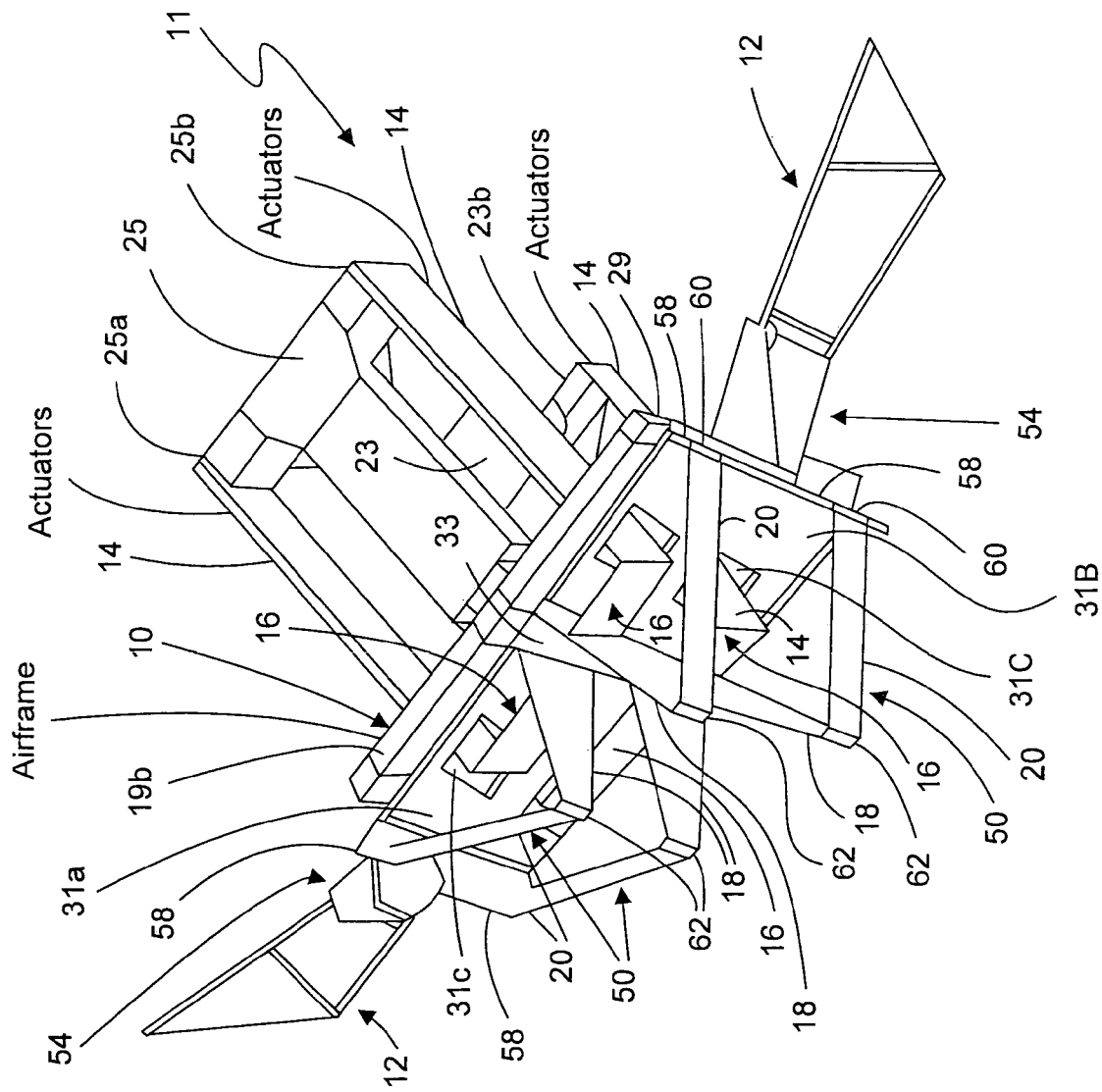
FIG. 3B is another perspective view of the embodiment of the MFI in FIG. 3A.
Figure 4:
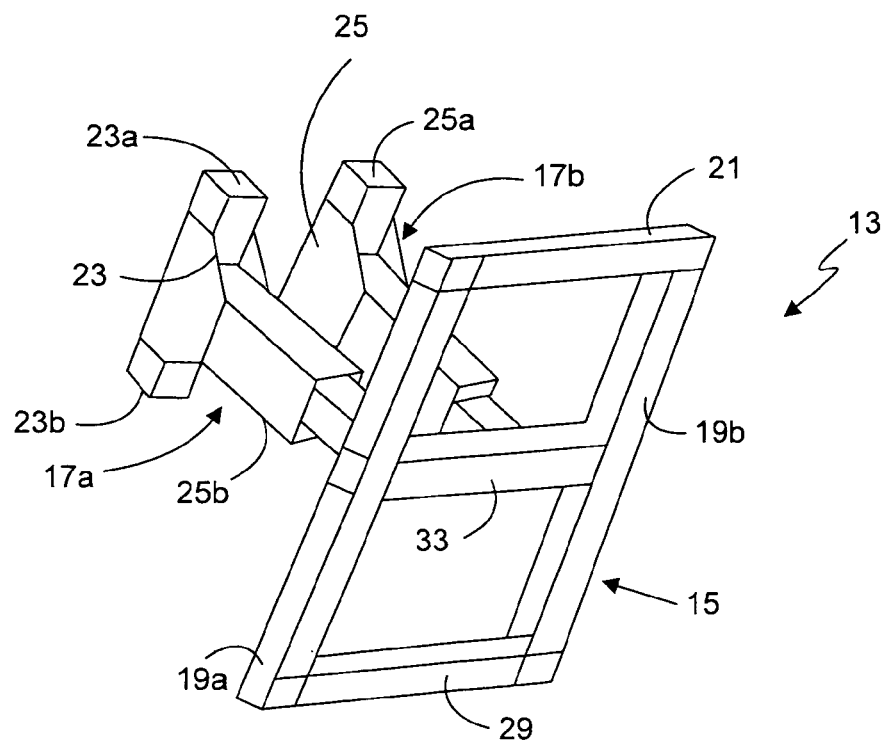
FIG. 4 is a perspective view of an embodiment of the airframe for the MFI.

The air frame 13 comprises a generally parallelepiped frame (e.g., a generally rectangular frame), generally illustrated as 15 in FIG. 4, and a pair of depending leg frames 17a and 17b connected to the parallelepiped frame 15 in any suitable manner. The parallelepiped frame 15 has a pair of side bars 19a and 19b, and a transverse bar 33 and a pair of end bars 21 and 29, all connected to the pair of side bars 19a and 19b. Leg frame 17a connects to side bar 19a and includes a base bar 23 having opposed ends 23a and 23b to which actuators (identified as "14" below) connect. Similarly, leg frame 17b connects to side bar 19b and includes a base bar 25 having opposed ends 25a and 25b to which actuators connect. A pair of support platforms 31a and 31b is respectively connected to transverse bar 33, end bar 29 and to transverse bar 33, end bar 21. Support platforms 31a and 31b each have a pair of openings 31c–31c through which an actuator passes, as best shown in FIG. 3B.

The drive assembly 10 broadly includes actuators 14, slider cranks 16 pivotally coupled to actuators 14 and to bars 18 (e.g., part of four bar linkage assembly 49). Bars 18 are pivotally attached to bars 20 (e.g., also part of four bar linkage assembly 49). Bars 18 are pivoted to lug flexures 24 at 26. Bars 20 are pivotally coupled to a wing 12 which is pivotally coupled to lug flexures 30 at 32.

Figure 5:
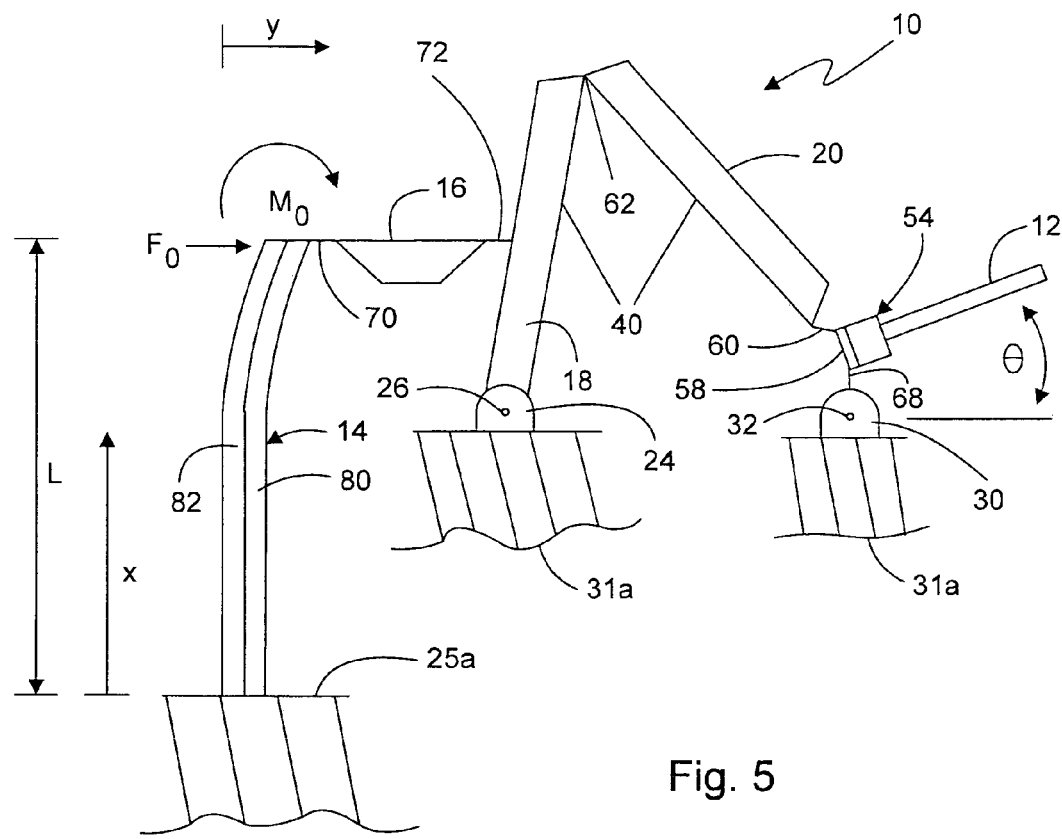
FIG. 5 is another schematic diagram of the embodiment of the driving assembly of FIG. 1 for a wing of an MFI.

The drive assembly 10 more specifically includes four (4) actuators 14—14—14—14, four (4) slider cranks 16—16—16—16, four (4) bar linkage assembly 49 including bar linkages 50—50—50—50, two (2) differential assemblies 54—54, and two (2) wings 12—12. Each of the support platforms 31a and 31b supports a pair of bar linkages 50—50. As best shown in FIG. 3C, each bar linkage 50 includes bar 18 and bar 20. Each bar 18 is coupled to a lug plate 58 by a flexure connection 60. Each bar 20 is coupled to bar 18 by flexure connections 62. Each bar 20 is also coupled to one of the support platforms 31a or 31b. Lug plates 58 are coupled to support platforms 31a and 31b via flexure connections 68. As best shown in FIGS. 3B, 3C and 5, a slider crank 16 interconnects an end of actuator 14 to bar 18 via flexure connections 70 and 72. Each actuator 14 is coupled to suitable electronics (not shown) for having a voltage applied to the actuator 14 and creating a field across the thickness of the actuator 14.

Figure 3A:
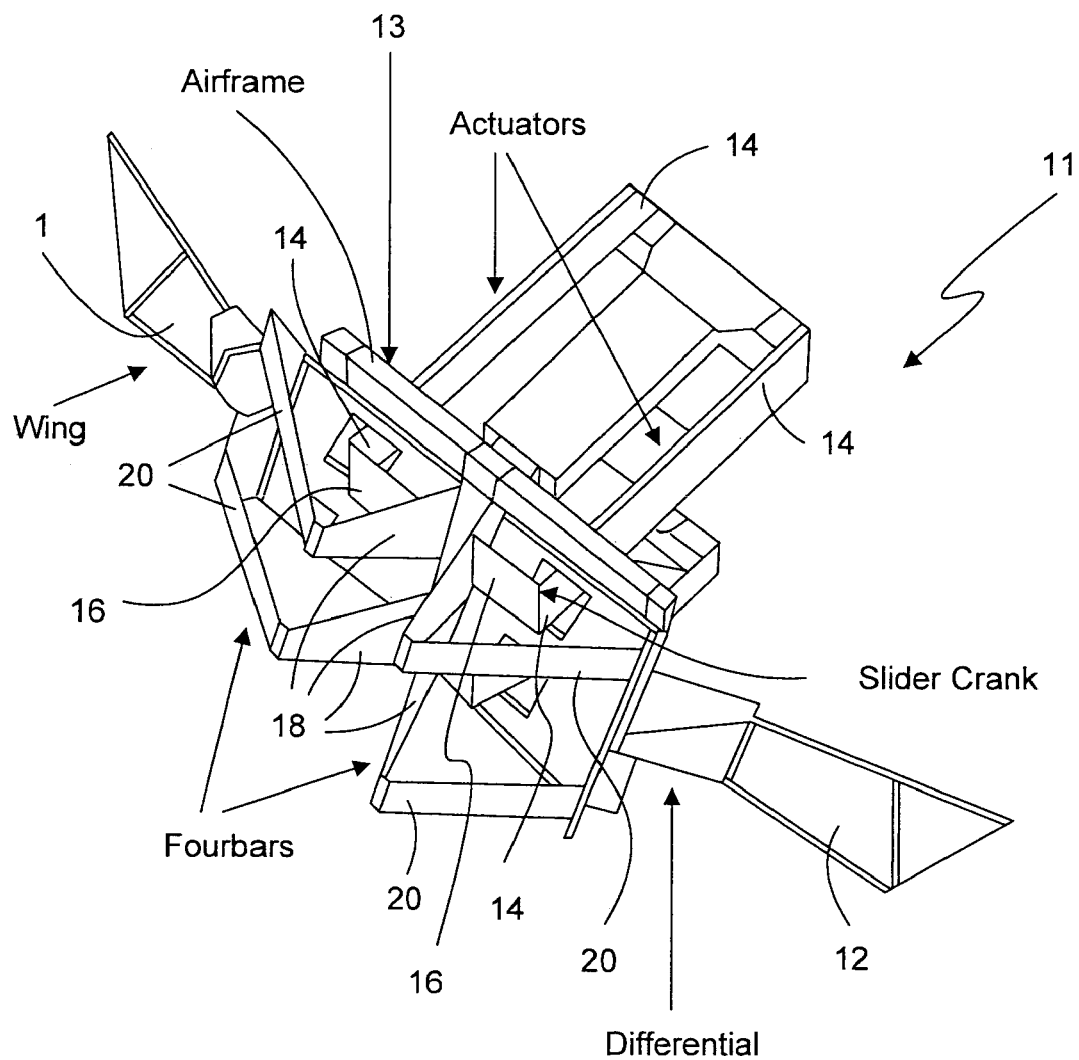
FIG. 3A is a perspective view of an embodiment of the MFI.
Figure 3C:
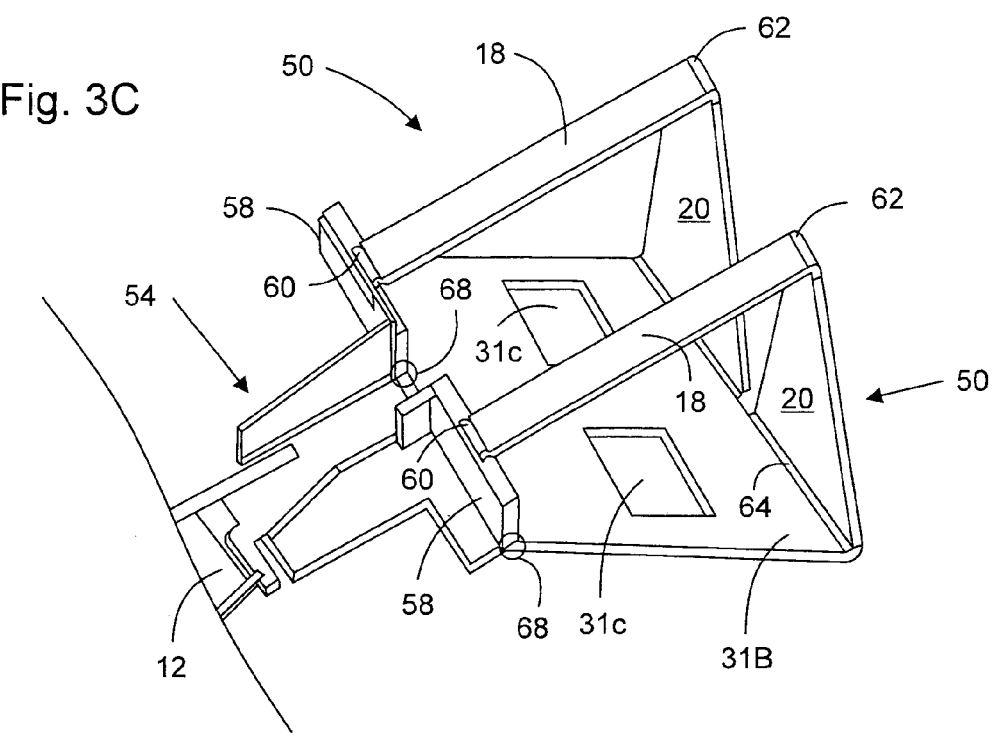
FIG. 3C is an enlarged perspective view of two of the four bar linkages coupled to the support platform and to the differential.

To drive the drive assembly 10 illustrated in FIGS. 1, 3A and 3B, piezoelectric bending actuators 14 are used. To achieve the high mechanical power density required for the drive assembly 10, the actuators 14 for various embodiments of the invention may comprise single crystal piezoelectric materials and high modulus carbon fiber based passive layers. Under internal loading, the maximum achievable strain for an amorphous piezoceramic material (e.g. PZT-5H) is approximately 0.3%. For single crystal piezoelectric materials the fracture strain is increased to a value greater than 1% (e.g., PZn-PT). Utilizing the thermal expansion properties of various composite materials for various embodiments of the invention allows for extrinsically increasing the fracture toughness of these actuator materials. A 1% compressive strain bias placed to the piezoceramic layer increases the strain energy density by 300%. Since the piezoelectric coupling coefficients of these single crystal piezoelectric materials are much higher than their amorphous counterparts, the strain energy density of the actuators 14 may be is increased by a factor of 10.

Figure 3D:
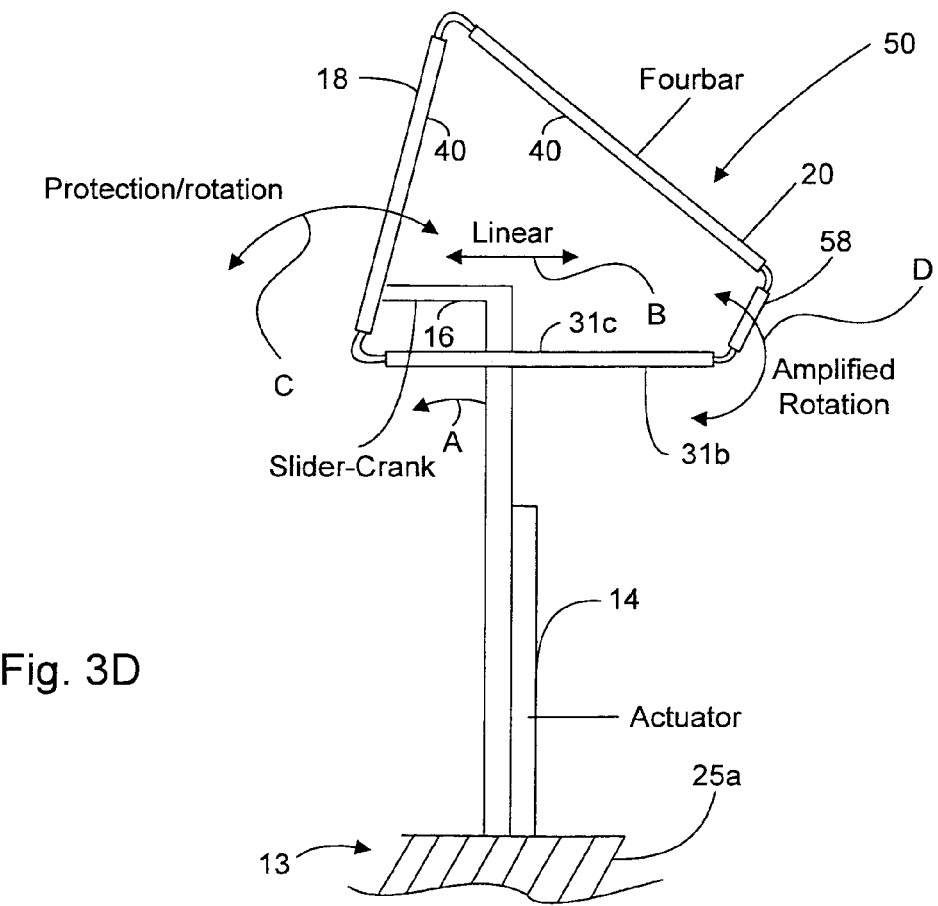
FIG. 3D is a side elevational view illustrating the relative motions of an actuator, a slider crank and a four bar linkage.
Figure 3E:
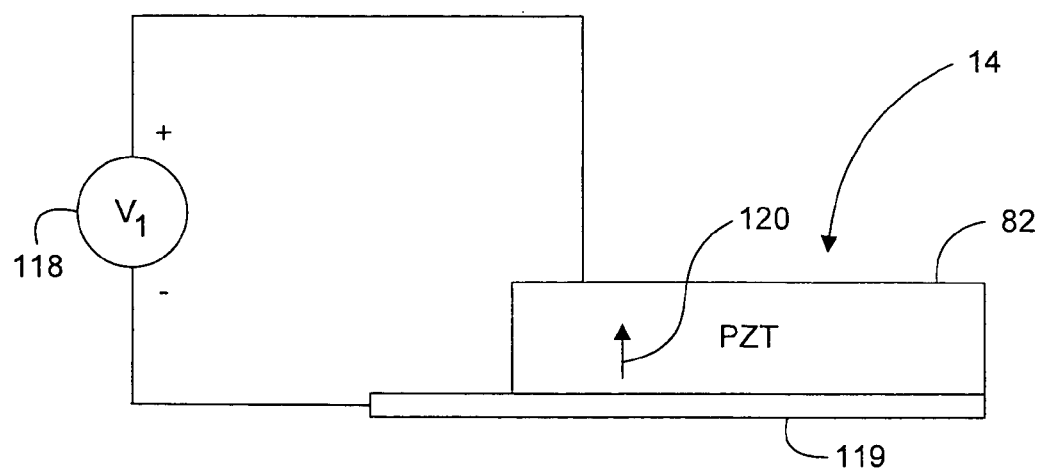
FIG. 3E is an electrical schematic drawing showing the electrical field and poling direction when an electrical circuitry is hooked up to a PZT layer.

The actuators 14 may be constructed by laminating together a piezoelectric layer and an anisotropic passive layer in an ordered fashion and curing them together. The orientations, mechanical, and piezoelectric properties of the constituent materials are of importance for the performance of the actuators 14. With a mixture of piezoelectric materials and non-piezoelectric materials (e.g., anisotropic passive constituent layers(s)) within the actuators 14, either symmetric extension/contraction or uniform bending will occur when an electric field is applied to the piezoelectric material. Referring now to FIG. 3E there is seen an electrical schematic drawing showing the electrical field and poling direction when an electrical circuitry is hooked up to a PZT layer. Extension or contraction occurs when the piezoelectric materials are symmetric about the neutral axis while bending will occur when this symmetry does not exist. The anisotropic passive constituent layers produce a unidirectional composite that is capable of bending-twisting or extension-twisting coupling.

For various embodiments of the present invention, each actuator 14 comprises as best illustrated in FIG. 12 a piezoelectric layer 80, and a passive composite elastic layer 82 coupled to the piezoelectric layer 80 by a bonding layer 84. The bonding material for the bonding layer 84 may be any suitable bonding material, preferably a matrix epoxy from the composite prepreg. The bonding material for the bonding layer 84 may be purchased commercially from YLA Inc.

The piezoelectric layer 80 may comprise a single crystal relaxor-based piezoelectric material (e.g. PZN-PT, PMN-PT) and/or amorphous polycrystalline (PZT) ceramic piezoelectric material. Single crystal piezoelectric materials exhibit a greater piezoelectric coupling coefficient than the PZT materials. However, the PZT materials exhibit a higher fracture toughness which may be more suitable for certain embodiments of the present invention.

The passive composite elastic materials for the passive layer 82 comprise unidirectional ultra high modulus (UHM, such as Young's modulus greater than about 50 GPa) carbon or graphite fiber, and an epoxy resin (e.g. an uncured epoxy resin). The passive layer 82 comprises from about 30% by vol. to about 80% by vol. of carbon or graphite fiber, more preferably from about 40% by vol. to about 70% by vol., most preferably from about 50% by vol. to about 60% by vol. of the carbon or graphite fiber. The carbon or graphite fiber may be purchased under the product name M60J from YLA Inc.

The epoxy resin may be any suitable thermosetting resin based on the reactivity of the epoxide group. A suitable epoxy resin is made from epichlorohydrin and aromatic bisphenol A (or aliphatic polyols, such as glycerol having glycidyl ether structures). Another suitable epoxy resin comprises polyolefins oxidized with peracetic acid. A suitable epoxy resin may be catalyzed with any suitable catalyst. For various embodiments of the present invention the passive layer 82 comprises from about 20% by vol. to about 70% by vol. of the epoxy resin, more preferably from about 30% by vol. to about 60% by vol., most preferably from about 40% by vol. to about 50% by vol., of the epoxy resin.

The passive layer(s) 82 comprise(s) a Young's modulus in the horizontal or longitudinal direction ranging from about 50 GPa to about 500 GPa; preferably from about 100 GPa to about 400 GPa, most preferably from about 200 GPa to about 300 GPa, and a Young's modulus in the transverse direction ranging from about 1 GPa to about 10 GPa, preferably from about 3 GPa to about 7 GPa, most preferably from about 4 GPa to about 6 GPa. To provide flexibility in the design and construction of the actuators 14, the thickness of the bonding and passive layer(s) is preferably as thin as possible. In various embodiments of the invention, the thickness of the passive layer(s) 82 is less than about 40 μm (e.g. from about 10 μm to less than about 30 μm) more preferably less than about 30 μm (e.g. from about 10 μm to about 20 μm) most preferably less than about 20 μm (e.g. from about 5 μm to about 15 μm).

Depending upon the desired motion of the actuators 14, the number and relative orientations of the respective combined layers are determined and each layer is cut using a laser-micromachining stage. Then each layer is assembled together, still in an uncured state, and cured in a vacuum oven and subsequently released.

Figure 6:
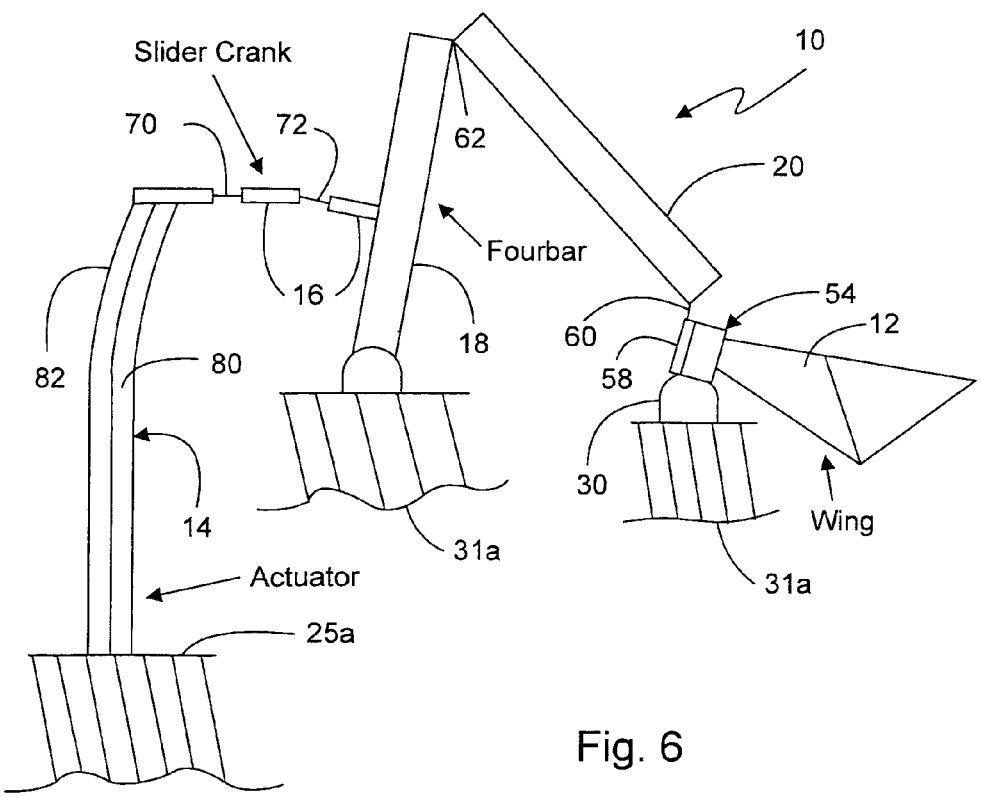
FIG. 6 is yet still another schematic diagram of the embodiment of the driving assembly of FIG. 1 for a wing of an MFI.

Referring now to FIGS. 5 and 6, there is seen on the actuators 14 comprising piezoceramic (PZT) layer 82 (a dielectric material) and elastic layer 80. Applying an electric field to the piezo layer 82 forms a strain in the piezo layer 82. Since the PZT motion is restricted by the elastic layer 80, a stress develops. This stress within the actuator 14 may vary through the cross section of the actuator 14; thus, there is an effective moment $M_O$ in the beam as illustrated in FIG. 5, causing a deflection. The strain in the PZT layer 82 is given by the following equation (1):

$$\varepsilon_1^p = \frac{1}{E_p} \cdot \sigma_1^p - d_{31} \frac{V_{app}}{t} \tag{1}$$

where: $E_p$ is PZT modulus, $\sigma_1^P$ is stress in the fiber direction, t is PZT thickness, $d_{31}$ is the piezoelectric constant and $V_{app}$ is the applied voltage. More generally, this strain may be given in the following form:

$$\begin{bmatrix} \varepsilon_1 \\ \varepsilon_2 \\ \gamma_{12} \end{bmatrix}_p = \begin{bmatrix} Q_{11} & Q_{12} & 0 \\ Q_{12} & Q_{22} & 0 \\ 0 & 0 & Q_{66} \end{bmatrix}_p^{-1} \begin{bmatrix} \sigma_1 \\ \sigma_2 \\ \tau_{12} \end{bmatrix}_p - \begin{bmatrix} d_{31} \\ d_{32} \\ 0 \end{bmatrix} \frac{V_{app}}{t} \tag{2}$$

Assuming that the piezoelectric layer 82 is transversely isotropic ($d_{31}=d_{32}$), $d_{36}$ is taken to be 0; thus, there is no shearing forces or twisting moments applied by the piezoelectric. Solving equation (2) for the stresses in the PZT layer gives the following:

$$\begin{bmatrix} \sigma_1 \\ \sigma_2 \\ \tau_{12} \end{bmatrix}_p = \begin{bmatrix} Q_{11} & Q_{12} & 0 \\ Q_{12} & Q_{22} & 0 \\ 0 & 0 & Q_{66} \end{bmatrix}_p \cdot \left( \begin{bmatrix} \varepsilon_1 \\ \varepsilon_2 \\ \gamma_{12} \end{bmatrix}_p - \begin{bmatrix} d_{31} \\ d_{32} \\ 0 \end{bmatrix} \frac{V_{app}}{t} \right) \tag{3}$$

In equations (1) and (3), the $[Q_{ij}]_P$ terms are the material constants of the PZT as given in Table 1 below. Similarly, the stresses in the elastic layer 80 may be given as follows:

$$\begin{bmatrix} \sigma_1 \\ \sigma_2 \\ \tau_{12} \end{bmatrix}_e = \begin{bmatrix} Q_{11} & Q_{12} & 0 \\ Q_{12} & Q_{22} & 0 \\ 0 & 0 & Q_{66} \end{bmatrix}_e \cdot \begin{bmatrix} \varepsilon_1 \\ \varepsilon_2 \\ \gamma_{12} \end{bmatrix} \tag{4}$$

The forces and moments may be given as a function of the ply stresses:

$$[N_{ij}] = \int_0^h [\sigma_{ij}] dz \tag{5}$$

$$[M_{ij}] = \int_0^h [\sigma_{ij}] z \, dz$$

In equation (5), z is the linear variable through the thickness direction, and the term h is the total actuator thickness; thus, to solve for $N_{ij}$ and $M_{ij}$ in accordance with the following equations (6) the integrals need to be split into a summation over all layers of the actuator 14:

$$[N_{ij}] = \sum_k \int_{t_{k-1}}^{t_k} [\sigma_{ij}]_k \, dz \tag{6}$$

$$[M_{ij}] = \sum_k \int_{t_{k-1}}^{t_k} [\sigma_{ij}]_k z \, dz$$

where K is the total number of layers in the actuator 14.

Subsequently, the actuator properties may be determined as a function of the ply lay-up using laminate plate theory. First, the relationship between the midplane strains and curvatures and the forces and moments may be given by the following equation (7):

$$\begin{bmatrix} N \\ M \end{bmatrix} = \begin{bmatrix} A_{ij} & B_{ij} \\ B_{ij} & D_{ij} \end{bmatrix} \begin{bmatrix} \varepsilon^0 \\ \kappa \end{bmatrix} - \begin{bmatrix} N^P \\ M^P \end{bmatrix} \tag{7}$$

In equation (7) N and M are the external forces and moments acting on the actuator 14, and $N^P$ and $M^P$ are the piezoelectric forces and moments generated within the actuator 14. Also, the A, B, and D terms may be determined by the following equation (8):

$$A_{ij} = \sum_k (\overline{Q}_{ij})_k (z_k - z_{k-1}) \tag{8}$$

$$B_{ij} = \frac{1}{2} \sum_k (\overline{Q}_{ij})_k (z_k^2 - z_{k-1}^2)$$

$$D_{ij} = \frac{1}{3} \sum_k (\overline{Q}_{ij})_k (z_k^3 - z_{k-1}^3)$$

Assuming that there are no external forces and moments (i.e., that all extension and curvature is a result of the piezoelectric effect), there would be two terms of importance within equation (8): the curvature in the displacement direction, $K_x$ and the twist curvature, $K_{xy}$. These two quantities are related to the linear displacement of the tip of the actuator and the output twist angle in accordance with the following equations (9):

$$\delta = \frac{1}{2} \cdot \kappa_x \cdot l^2 \tag{9}$$

$$\gamma = \tan^{-1}\left(\kappa_{xy} \cdot \left(\frac{l^2 + w^2}{w}\right)\right)$$

where l is actuator length, w is actuator width, δ is the linear displacement of the tip of the actuator in meters, and γ is the output twist angle in radians. Because of the desired kinematics of the wing 12, it is preferred to have γ be as large as possible while keeping δ roughly the same as conventional actuators. Thus, the indicated numerical approach generates γ and δ as a function of the lay-up for a given input voltage. A Matlab script may be employed for searching a confined parameter space and determining the optimum γ and δ for each iteration. The results of this search gave a lay-up of [PZT /θ/0/0/θ], where θ are the ply angles. For this lay-up, γ and δ are given in FIGS. 19 and 20 as a function of ply angle, θ.

Figure 19:
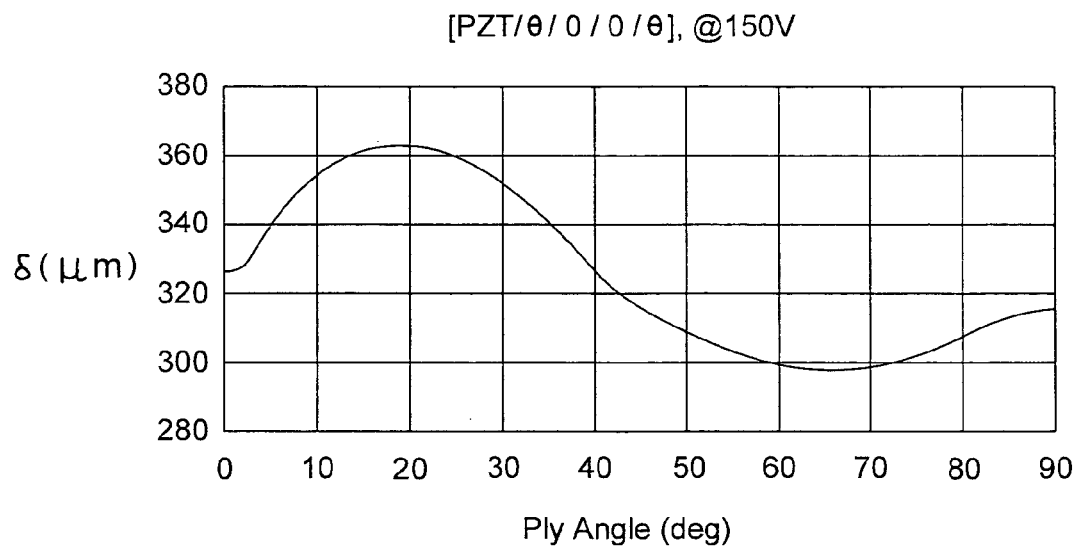
FIG. 19 is a graph of displacement as a function of lay-up.
Figure 20:
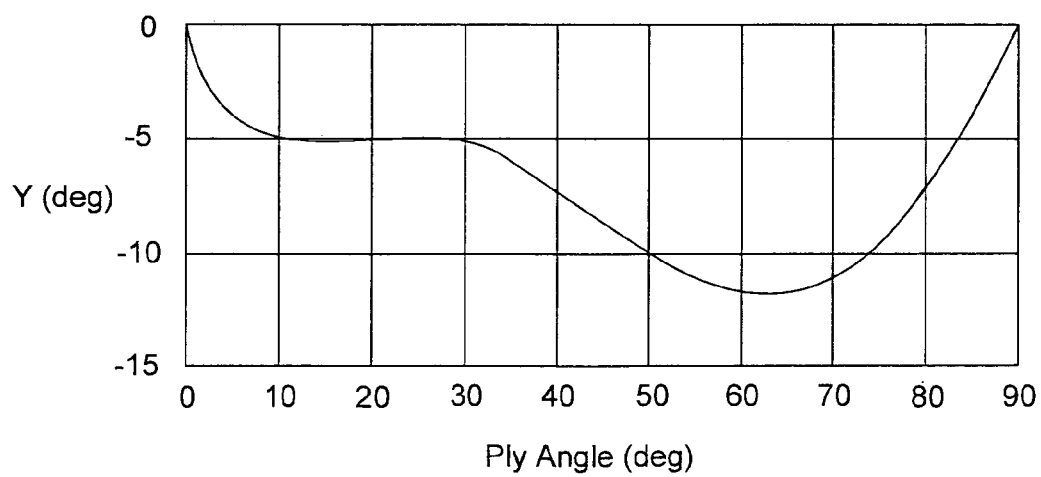
FIG. 20 is a graph of twist angle as a function of ply angle (deg.)
Figure 21:
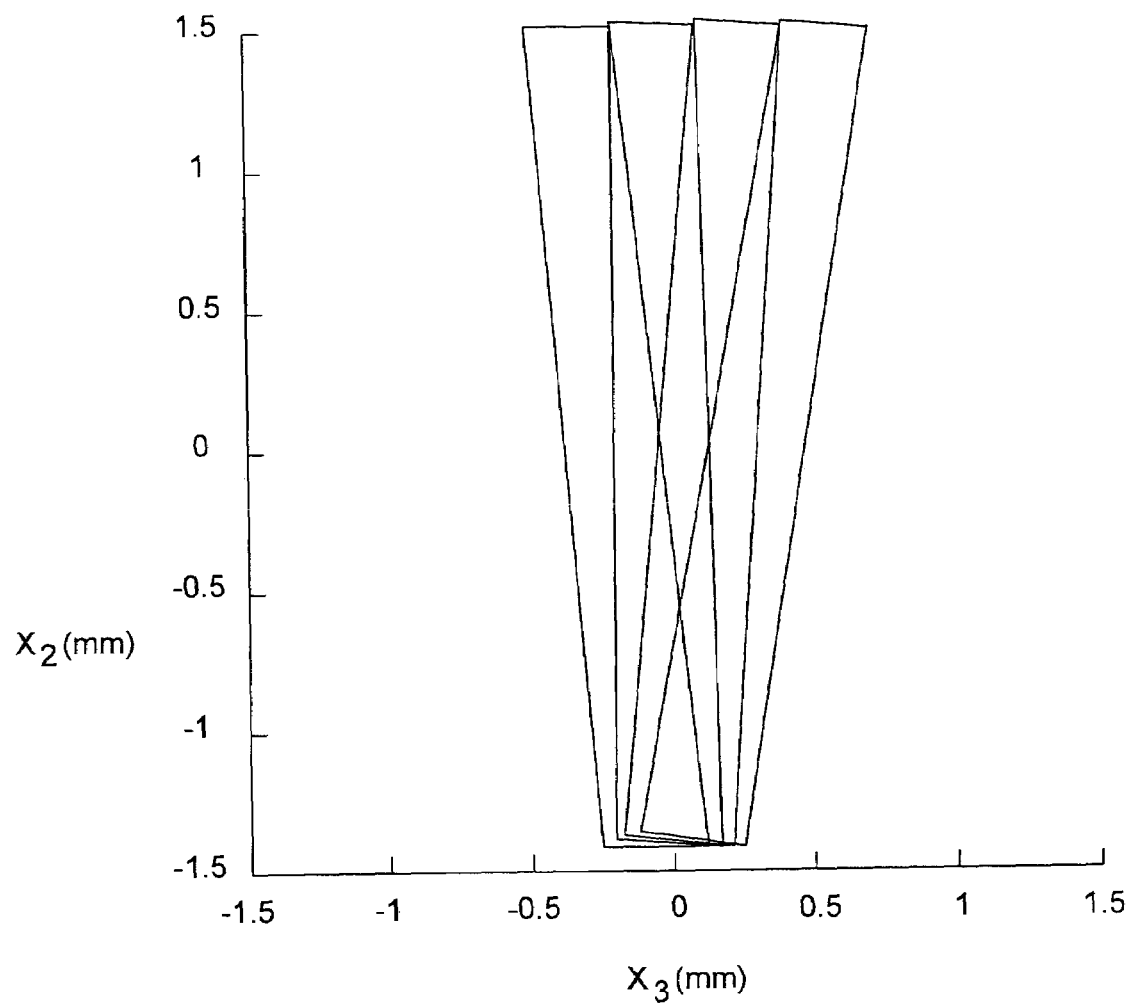
FIG. 21 is a graph of end-on view of an actuator through one complete cycle.

The graph in FIG. 19 illustrates that the maximum output twist angle occurs when θ=63 degrees, which corresponds to γ=12 degrees, and δ=300 μm. For these parameters, a four bar transmission ratio of 10 will produce a preferred output angle of 120 degrees. FIG. 19 also illustrates that the twist and displacement are robust to small changes in the ply angles. FIG. 21 shows a simulated end-on view of the actuator 14 through one cycle, where $x_2$ is the width direction and $x_3$ is the thickness direction.

For various embodiments of the present invention, actuators 14 comprise an average displacement of approximately 400 μm, and an average twist angle of about 6 degrees. The following Table 1 comprises various PZT design parameters for various embodiments of the present invention.

TABLE 1

| Parameter | Description | Value | Units |
| --- | --- | --- | --- |
| $E_p$ | PZT modulus | 63 | GPa |
| $v_p$ | PZT Poison's ratio | 0.28 | NA |
| $G_p$ | PZT shear modulus | 25 | GPa |
| $t_p$ | PZT thickness | 127 | μm |
| $d_{31}$ | Piezoelectric constant | 3.20E-10 | C/N |
| l | Actuator length | 16 | mm |
| w | Actuator width | 3 | mm |

The drive assembly 10 uses a slider crank 16 which relies upon the buckling strength of flexures within the slider crank 16 to determine the serial stiffness. Because of the non-linear motions of the actuator 14 and the four bar linkage 49; the slider crank 16 is preferably designed not to buckle. Preferably, the slider crank 16 increases the serial stiffness by ensuring that regardless of the position of the elements of the four bar linkage 49, there will be flexures within the slider crank 16 that are in tension. This concept has been attempted by using the standard steel beam construction, however it is ineffective since the construction is bulky, requiring too complex a structure to obtain links with the required stiffness. The stiffness of the slider cranks 16 should be higher than the rest of the thorax links within the four bar linkage 49, since the slider crank 16 will incur the highest forces. The complexity of the structure of the slider crank 16 could cause alignment errors to arise, leading to kinematics singularities and an increase in the effective parallel stiffness. Thus, if the stiffness of the sections of the slider crank 16 could remain high, while using a planar slider crank structure to decrease the complexity, the no-buckling slider crank 16 could be made in a small and efficient form factor. FIGS. 7–10 shows various embodiments of the completed no-buckling slider crank 16, made with various layers, $[90/0]_s$ with the polyester flexure layer in the middle.

Figure 7:
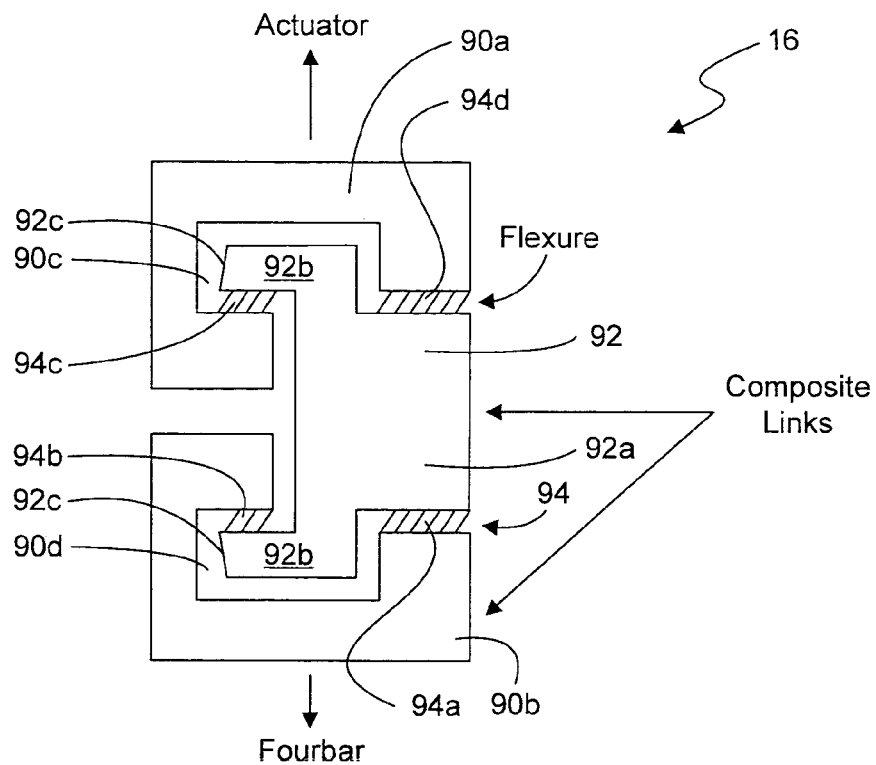
FIG. 7 is a vertical sectional view of an embodiment of the slider crank.
Figure 8:
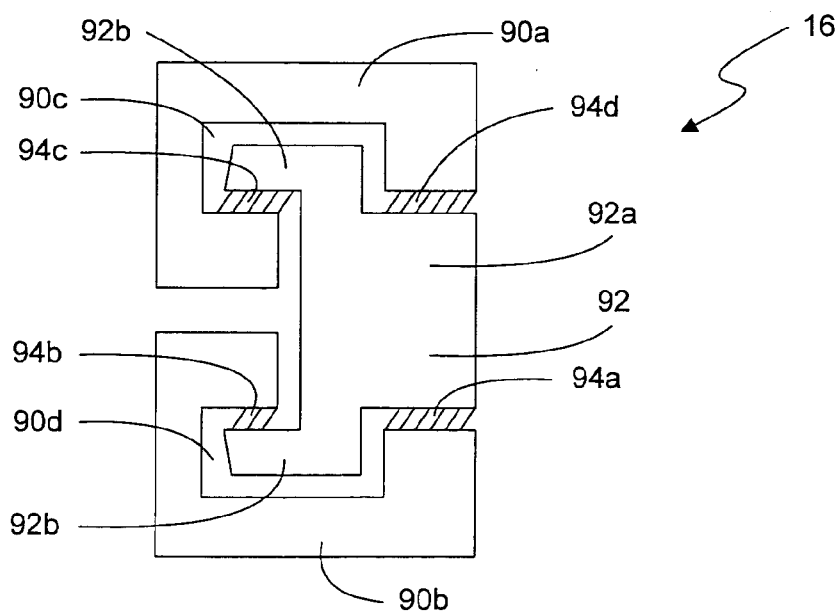
FIG. 8 is another vertical sectional view of the embodiment of the slider crank of FIG. 7.

For one embodiment of the invention as illustrated in FIGS. 7 and 8, the slider crank 16 is constructed by layering composite link 92 between composite links 90a and 90b such as to sandwich at least one thin flexure layer, generally illustrated as 94. Preferably, flexure layer 94 comprises flexures 94a, 94b, 94c and 94d. Composite link 92 comprises a composite body 92a having a pair of depending legs 92b–92b, each leg 92b terminating in a beveled surface 92c. Composite links 90a and 90b have respective openings 90c and 90d for receiving depending legs 92b and 92b.

Figure 10:
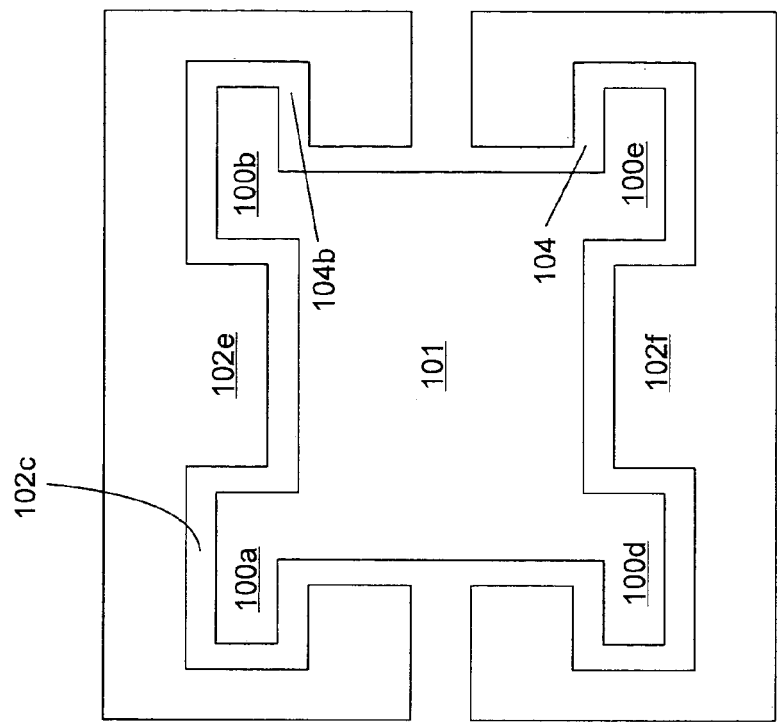
FIG. 10 is another vertical sectional view of the embodiment of the slider crank of FIG. 9.
Figure 9:
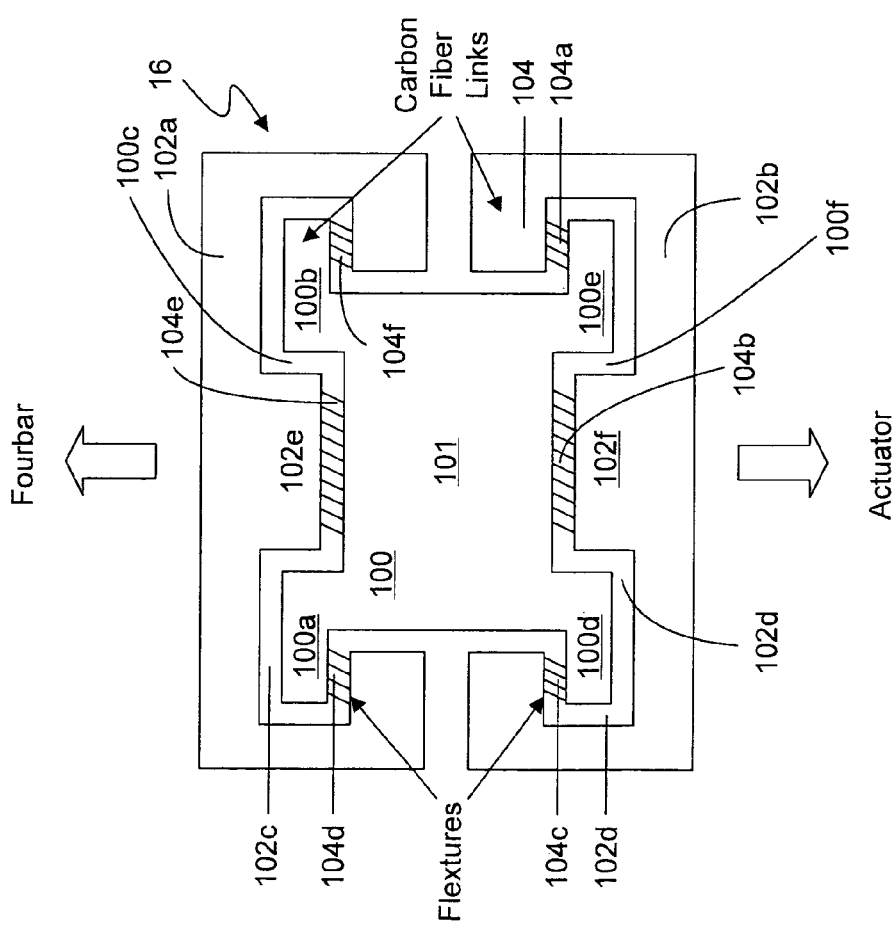
FIG. 9 is a vertical sectional view of another embodiment of the slider crank.

In another embodiment of the invention as illustrated in FIGS. 9 and 10, the slider crank 16 comprises a composite link 100 sandwiched between composite links 102a and 102b. A flexure layer, generally illustrated as 104, is conveniently disposed between composite link 100 and composite links 102a and 102b. Preferably, flexure layer 104 comprises flexures 104a, 104b, 104c, 104d, 104e and 104f. The composite link 100 comprises a composite body 101 having upper spaced links 100a and 100b separated by an opening 100c, and spaced lower links 100d and 100e separated by an opening 100f. The composite link 102a includes an opening 102c for receiving spaced upper links 100a and 100b. Composite link 102a also includes a tongue 102e which lodges within opening 100c of the composite link 100. Similarly, composite link 102b includes an opening 102d for receiving spaced lower links 100d and 100e. Composite link 102b also includes a tongue 102f which lodges within opening 100f of the composite link 100.

The composite material for the various composite layers (e.g., links 90a, 90b, 92, 100, 102a and 102b) comprises unidirectional ultra high modulus (UHM, such as Young's modulus greater than about 50 GPa, such as about 200 GPa) carbon or graphite fiber, and an epoxy resin (e.g. an uncured epoxy resin). The composite material may be isotropic with respect to the Young's modulus, and may be constructed using the following lay-up: [0/90/flexure/90/0] where 0 and 90 are the relative angles of the plies and the flexure comprises flexure layer 94 or flexure layer 104.

For various embodiments of the invention, the composite material for the various links of the slider crank 16 comprises from about 30% by vol. to about 80% by vol. of carbon or graphite fiber, more preferably from about 40% by vol. to about 70% by vol., most preferably from about 50% by vol. to about 60% by vol. of the carbon or graphite fiber. The carbon or graphite fiber may be purchased under the product name M60J from YLA Inc.

The epoxy resin in the composite material for the composite links of the slider crank 16 may be any suitable thermosetting resin based on the reactivity of the epoxide group. A suitable epoxy resin is made from epichlorohydrin and aromatic bisphenol A (or aliphatic polyols, such as glycerol having glycidyl ether structures). Another suitable epoxy resin comprises polyolefins oxidized with peracetic acid. A suitable epoxy resin may be catalyzed with any suitable catalyst. For various embodiments of the present invention the composite material for the composite links of the slider crank 16 comprises from about 20% by vol. to about 70% by vol. of the epoxy resin, more preferably from about 30% by vol. to about 60% by vol., most preferably from about 40% by vol. to about 50% by vol., of the epoxy resin.

The composite material for the composite links of the slider crank 16 comprises a Young's modulus in the horizontal or longitudinal direction ranging from about 50 GPa to about 500 GPa; preferably from about 100 GPa to about 400 GPa, most preferably from about 200 GPa to about 300 GPa, and a Young's modulus in the transverse direction ranging from about 1 GPa to about 10 GPa, preferably from about 3 GPa to about 7 GPa, most preferably from about 4 GPa to about 6 GPa.

The thickness of the combined layers/links of the slider crank 16 is preferably as small as possible to allow for unocluded pivotation at the joints. In various embodiments of the invention, the thickness of the combined layers/links of the slider crank 16 is less than about 100 μm (e.g. from about 50 μm to less than about 100 μm), more preferably less than about 50 μm (e.g. from about 25 μm to less than about 50 μm), most preferably less than about 25 μm (e.g. from about 5 μm to less than about 25 μm).

For various embodiments of the present invention, each layer/link of the composite material in the slider crank 16 is laser micromachined on a single ply basis and placed into a mold along with one of the flexure layers, such as flexure layer 94 or flexure layer 104. All links/layers are subsequently cured together under vacuum and released.

The flexure layer(s) (i.e., flexure layer 94 or 104) is preferably as thin and compliant as possible without plastically deforming in the presence of large tensile loads. The flexure layer(s) comprises any suitable material. For various embodiments of the invention the flexure layer(s) comprises any suitable polymer, preferably polyester. The thickness of the flexure layer(s) is less than about 20 μm (e.g. from about 10 μm to less than about 20 μm), more preferably less than about 10 μm (e.g. from about 5 μm to less than about 10 μm), most preferably less than about 5 μm (e.g. from about 1 μm to less than about 5 μM).

The flexure connections (i.e., flexure connections 60, 62, 64 and 68) are preferably as thin and compliant as possible without plastically deforming in the presence of large tensile loads. The flexure connections comprise any suitable material. For various embodiments of the invention the flexure connections comprise any suitable polymer, preferably polyester. The thickness of the flexure connections is less than about 20 μm (e.g. from about 10 μm to less than about 20 μm), more preferably less than about 10 μm (e.g. from about 5 μm to less than about 10 μm), most preferably less than about 5 μm (e.g. from about 1 μm to less than about 5 μm).

The polyester for all flexure layer(s) and all flexure connections for various embodiments of the present invention may comprise polyester resin from any of a group of synthetic resins, which are polycondensation products of dicarboxylic acids with dihydroxy alcohols. The polyester resin may comprise ethylenic unsaturation, generally introduce by unsaturated acids (e.g., maleic and fumaric acids). The unsaturated polyesters are typically cross-linked through their double bonds with a compatible monomer, also containing ethylenic unsaturation, and thus become thermosetting.

The actuators 14 drive the four bar linkage assembly 49 which includes the bar linkages 50—50—50—50 having a structure 40 comprising generally hollow beams as links and flexures (e.g., polymer flexures such as polyester flexures) as joints. As previously indicated, between any actuator 14 and a bar linkage 50 is a slider crank 16 which converts the approximately linear motion of the tip of the actuator 14 to a partial rotation or pivotation at the base of the bar linkage 50. In an embodiment of the present invention, any actuator 14 includes an electrode, a PZT layer, another electrode, a bonding layer (e.g., a matrix epoxy), and an elastic layer. The electrodes are deposited onto the PZT layer by the manufacturer. More specifically, referencing FIGS. 3D and 3E, for the actuation a voltage from a power source 118 is applied to the actuator electrode(s) 119 for creating an electric field 120 across the thickness of the piezoelectric material 82 which causes it to contract. Since this contraction is limited by the passive elastic layer 80, a moment $M_o$ is generated which causes the actuator structure to bend or buckle. This small deflection initially needs to be converted to a pivotation/partial rotational motion, and then amplified. The slider crank 16 attached on the distal end of the actuator 14 moves in direction of arrow B towards bar 18, causing bar 18 to pivot or rotate in accordance with arrow C away from actuator 14 and converting a generally linear motion (i.e., a buckling or bending motion) of the actuator 14 to a pivotation/partial rotation at the base (i.e., at the base of bar 18) of the bar linkage 50. The bar link (bars 18, 20, including lug plates 58) lengths are not uniform, thus creating a mechanical amplifier. The input pivotation/partial rotation caused by the slider crank 16 is amplified by the respective bar linkage 50, and the output of the respective bar linkage 50 is thus a large partial rotational motion as evidence by arrow D in FIG. 3D. Because the buckling, bending motion is a periodic motion (going back and forth) from the periodic application and release of the voltage from the power source 118, the various initial movements the bar linkage 50 (bars 18, 20, including lug plates 58) and slider crank 16 are reversed in direction, causing a corresponding reversal in the large partial rotation motion (about 120°) as indicated by arrow D. The partial rotation motion and reverse of the partial rotation motion as indicated by arrow D, causes an appended wing 12 to flap as a wing of a flying insect.

Figure 13:
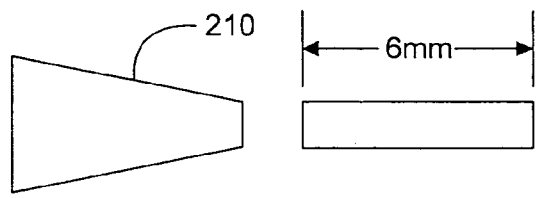
FIG. 13 is a top plan view of the laser micro machined face sheet for the four bars.
Figure 14:
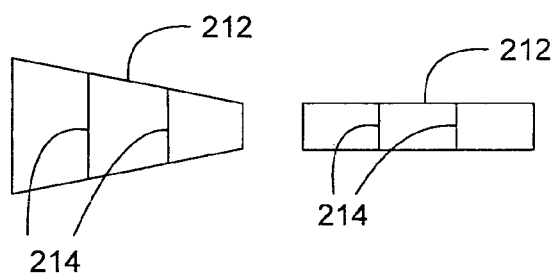
FIG. 14 is a top plan view of the honeycomb section of the face sheet for the four bars.
Figure 15:
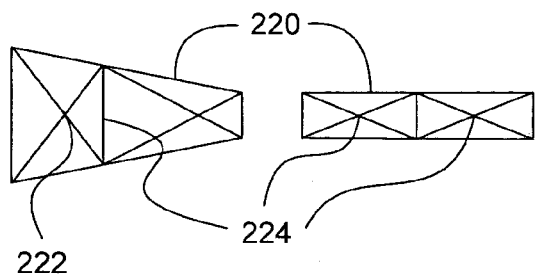
FIG. 15 is a vertical sectional view of the molded honeycomb core for the four bars.

Referring in detail now to FIGS. 13–18, there is seen in FIG. 13 a top plan view of a face sheet 210 (a carbon face sheet) for the bars (e.g., bars 18 and 20), of the bar linkage assembly 49. FIG. 14 is a top plan view of a honeycomb core comprising a carbon fiber frame 212 and transverse from carbon fiber ribs 214. There is no material between the ribs 214 and the frame 212, and a pair of face sheets 210—210 would sandwich the frame 212 and ribs 214. FIG. 15 is a top plan view of a similar core structure comprising frame 220, transverse ribs 224, and criss-cross ribs 220. The frame 220 and ribs 224 and 220 are molded from a suitable plastic, such as polyurethane. For this embodiment of the invention, a pair of face sheets 210—210 would sandwich the frame 220 and ribs 224 and 222.

Figure 16:
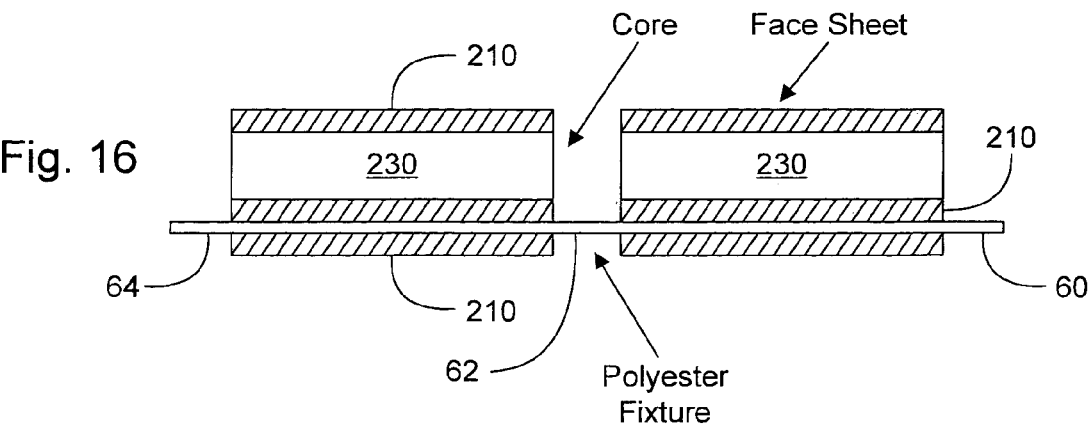
FIG. 16 is a vertical sectional view of the lay-up of layers for four bars.
Figure 18:
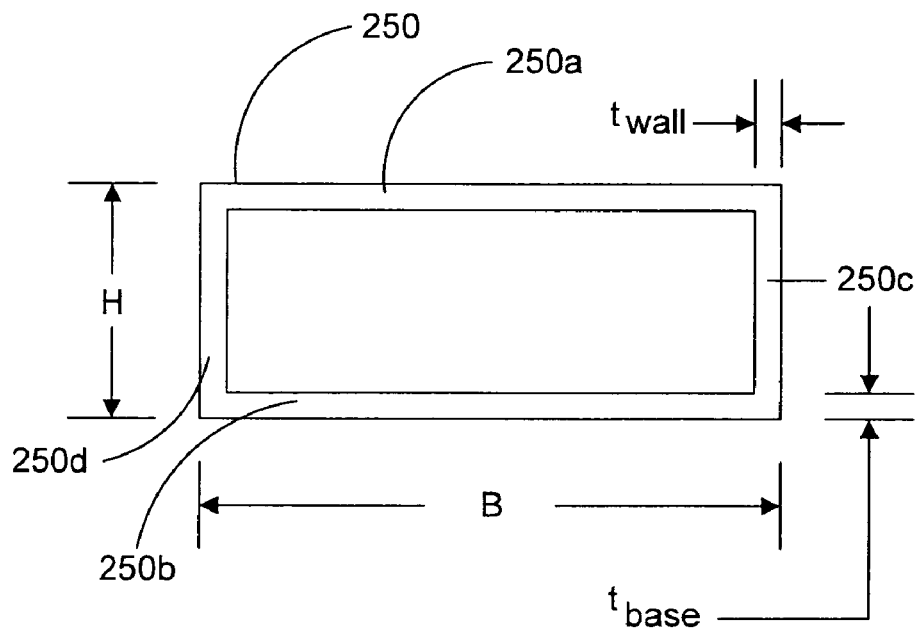
FIG. 18 is a vertical sectional view of another embodiment of the four bar structure.

Referring now to FIG. 16, there is seen a vertical sectional view of two quadrilateral-shaped links/bars as illustrated in FIG. 18 and a flexure (i.e., flexure 60, 62, and 64). The three face sheets 210 are preferably carbon fiber, the flexure is preferably polyester, and the core 230 may comprise at least one of: the carbon fiber ribs of FIG. 14, the molded polyurethane ribs of FIG. 15, or a syntactic foam, such as honeycomb structure/foam of FIG. 2.

Figure 17:
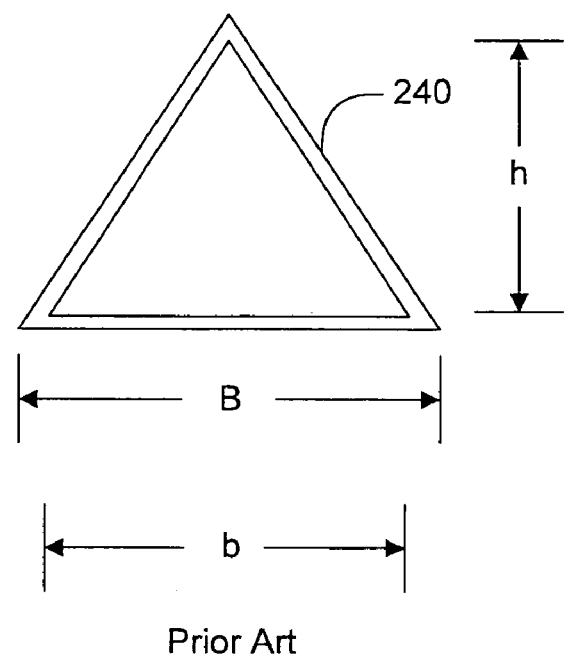
FIG. 17 is a vertical sectional view of one embodiment of the four bar structure.

Referring now to FIG. 17 there is seen a vertical sectional view of a prior art bar/beam 240. The triangular cross section has nothing in the middle and the shell is constructed from stainless steel. FIG. 18 is a cross section of the improved bars/links 250 for the bar linkage 49. The top and bottom layers 250a and 250b are preferably comprise carbon (e.g., carbon fiber), and the sides 250c and 250d would be determined by what core material (e.g., carbon, polyurethane, foam, honeycomb, etc) for the frames (e.g., frames 212, 220, etc) employed.

The links (e.g., bars 18 and 20) within the four bar assembly 49 have dimensions ranging from about 0.5 mm to about 5 mm for lengths and ranging from about 0.5 mm to about 1 mm for widths. Thus, for any of the previously indicated honeycomb structure, using a cell wall size of an order of magnitude less than the smallest dimension within the four bar linkage assembly 49 gives about 50 μm as a dimension for one of the smaller beam/bar widths. For fiber-reinforced (e.g., carbon fiber-reinforced) beams/bars with fiber diameters of around 10 μm, this would be approximately one of the limiting size for the links including the associated materials. In producing the links (e.g., bars 18 and 20) of the bar linkage assembly 49, uncured layers/materials are preferably employed. Uncured layers/materials have the benefit- of being able to lay-up the laminae for the links and the flexures a polymer for the joints at one time, and cure this laminate without the need of extra adhesive layers. In am embodiment of the present invention, the links (e.g., bars 18 and 20) may possess the lamina parameter listed in the following Table 2:

TABLE 2

| Parameter | Description | Value | Units |
|---|---|---|---|
| $E_1$ | UHM longitudinal modulus | 350 | GPa |
| $E_2$ | UHM transverse modulus | 7 | GPa |
| $v_{12}$ | UHM Poison's ratio | 0.33 | NA |
| $G_{12}$ | UHM shear modulus | 5 | GPa |
| $t_{UHM}$ | UHM ply thickness | 25 | µm |

For the maximum weight savings and for various embodiments of the invention, the beams/links for the four bar assembly 49 are preferably not solid structures. Preferably, a honeycomb configuration as illustrated in FIGS. 14–16 may be employed. An analysis for the beams/links for four bar assembly 49 is aimed at matching the stiffness of the conventional stainless steel beams such as that illustrated in FIG. 17 while minimizing the weight of the beam/links. First, the stiffness of a double supported cantilever beam/link may be determined by the following equation (10):

$$K = \frac{48EI}{l^3} \tag{10}$$

wherein E is the Young's modulus, I is the cross sectional moment of inertia, and l is the beam length.

For conventional beams four bar assembly 49 and having a hollow triangular cross section as illustrated in FIG. 17, the cross sectional moment of inertia may be determined by the following equation:

$$I_s = \frac{\sqrt{3}}{96}(B^4 - (B - t_s)^4) \tag{11}$$

The cross sectional moment of inertia of a honeycomb structure for embodiments of the invention may be determined in accordance with the following equation:

$$I_s = \frac{1}{12}(BH^3 - bh^3) \tag{12}$$

where B is the outer width, H is the outer height, b is the inner width, and h is the inner height.

FIGS. 17 and 18 illustrate the cross sections defined respectively in equation (11) and (12). For conventional parameters of a conventional four bar linkage assembly for a MFI, the link stiffness is 39348 N/m and the mass is 2.34 mg. An objective is to match the conventional stiffness using the honeycomb structure for embodiments of the present invention by optimizing over the geometric parameters shown in FIG. 18. To simplify this, the parameter $t_{base}$ is set to 50 µm since up to two 25 µm plies can be cut at once. This is done to simplify and expedite construction. Also, the parameter B is set to 1 mm so to allow the beams/links of the four bar assembly 49 to fit into the current form factor. Thus, a two-parameter optimization can be done over $t_{wall}$ and H, with a restriction that $t_{wall}$ cannot be less than the carbon fiber diameter. By matching the stiffness of the beams/links for various embodiments of the present invention with conventional link stiffness and for the given geometric parameters, the mass of the individual beams/links for various embodiments of the present invention ranges from about 0.75 mg to about 2.1 mg, more preferably from about 0.90 mg to about 1.5 mg, most preferably from about 1.0 mg to about 1.3 mg, such as about 1.16 mg, which is roughly half the conventional link mass.

The capabilities of the carbon fiber MFI thorax for the present invention may be compared to the capabilities from a conventional steel version with the same dimensions, and using a similar actuator. The two main dynamic parameters which are affected by the lower inertia are the resonant frequency and the mechanical Q. The Q is required to be low since it determines the ratio between the inertia force and the aerodynamic force. The resonant frequency is desired to be high since an increase in velocity increases the work done by the wing 12 on the air. For a given stiffness, reducing the mass by a factor of two will give a rise in resonant frequency by a factor of 1.414. The resonant frequency of conventional models is about 120 Hz with a Q of 3.5 while the four bar assembly 49 of the present invention gives a resonant frequency of 190 Hz with a Q of 2.5.

Figure 2:
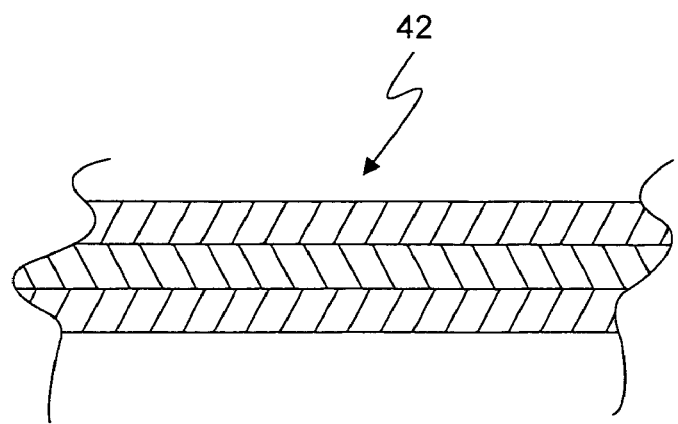
FIG. 2 is a partial sectional side elevational view of a honey comb structure for various embodiments of the present invention.

The beams/links of the four bar assembly 49 for the drive assembly 10 preferably comprises a structure 40, such as a honey comb structure generally illustrated as 42 in FIG. 2. A honey comb structure includes any structure that resembles a honeycomb in structure or appearance. A honey comb structure may comprise a cellular structural material or any structure comprising cavities like a honeycomb.

The structure 40 has a stiffness to weight ratio greater than about $16 \times 10^{10}$ N/mKg, more preferably greater than about $18 \times 10^{10}$ N/mKg, most preferably greater than about $20 \times 10^{10}$ N/mKg including greater than about $24 \times 10^{10}$ N/mKg, where N is newtons, and "m" is meters, and Kg is kilograms. The structure 40 (e.g., honey comb structure 42) comprises carbon, more preferably a carbon material sold under the product name M60J UHM carbon fiber reinforced epoxy by YLA incorporated.

In an embodiment of the invention the stiffness to weight ratio of the structure 40 (e.g., the honey comb structure 42) ranges from about $16 \times 10^{10}$ N/mKg to about $50 \times 10^{10}$ N/mKg, more preferably from about $18 \times 10^{10}$ N/mKg to about $40 \times 10^{10}$ N/mKg, most preferably from about $20 \times 10^{10}$ N/mKg to about $30 \times 10^{10}$ N/mKg, including from about $24 \times 10^{10}$ N/mKg to about $28 \times 10^{10}$ N/mKg (e.g., about $26 \times 10^{10}$ N/mKg).

The structure 40 has a longitudinal Young's modulus greater than about 200 GPa, preferably greater than about 250 GPa, most preferably greater than about 300 GPa including greater than about 325 GPa. In an embodiment of the invention the longitudinal Young's modulus of the structure 40 (e.g., the honey comb structure 42) ranges from about 200 GPa to about 600 GPa, more preferably from about 250 GPa to about 500 GPa, most preferably from about 300 GPa to about 400 GPa, including from about 325 GPa to about 375 GPa (e.g., about 350 GPa).

The structure 40 has a ply thickness greater than about 13 µm, preferably greater than about 18 µm, most preferably greater than about 22 µm including greater than about 24 µm, where "µm" is micrometers. In an embodiment of the invention the ply thickness of the structure 40 (e.g., the honey comb structure 42) ranges from about 13 µm to about 50 µm, more preferably from about 18 µm to about 40 µm, most preferably from about 22 µm to about 30 µm, including from about 24 µm to about 28 µm (e.g., about 25 µm).

The structure 40 has a density of less than about 2200 kg/m³, preferably less than about 2000 kg/m³, most preferably less than about 1800 kg/m³ including less than about 1700 kg/m³, where "kg" is kilograms and "m" is meters. In an embodiment of the invention the density of the structure 40 (e.g., the honey comb structure 42) ranges from about 200 kg/m³ to about 2200 kg/m³, more preferably from about 1000 kg/m³ to about 2000 kg/m³, most preferably from about 1400 kg/m³ to about 1800 kg/m³, including from about 1550 kg/m³ to about 1750 kg/m³ (e.g., about 1650 kg/m³).

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A drive assembly for a wing of a micromechanical flying insect comprising an actuator; a crank coupled to the actuator; and a linkage assembly coupled to the crank, said linkage assembly comprising a support platform having an aperture where through said actuator extends, a first flexure connection connected to the support platform, a first bar member connected to the first flexure, a second flexure connection connected to the first bar, and a second bar member connected to the second flexure connection.

2. The drive assembly of claim 1 wherein said linkage assembly comprises a stiffness to weight ratio greater than about $16 \times 10^{10}$ N/mKg.

3. The drive assembly of claim 1, wherein the actuator includes a piezoelectric layer, a bonding layer, and an elastic layer coupled to the bonding layer.

4. The drive assembly of claim 3 wherein said elastic layer comprises from about 30% by vol. to about 80% carbon, and from about 20% by vol. to about 70% by vol. epoxy resin.

5. The drive assembly of claim 1 wherein said linkage assembly comprises a structure having a longitudinal Young's modulus greater than about 200 GPa, and a density less than about 2200 kg/m³.

6. The drive assembly of claim 1 additionally comprising a third flexure connection connected to the second bar, a lug plate connected to the third flexure connection, and a fourth flexure connection connected to the lug plate and to the support platform.

7. The drive assembly of claim 6 additionally comprising a differential assembly coupled to the fourth flexure connection.

8. The drive assembly of claim 6 additionally comprising a differential assembly coupled to the lug plate.

9. A drive assembly for a wing of a micromechanical flying insect comprising an actuator; a crank coupled to the actuator; and a linkage assembly coupled to the crank, said linkage assembly comprising a first face sheet, a core supporting the first face sheet, a second face sheet bound to the core, a polyester flexure disposed against the second face sheet, and a third face sheet disposed against the polyester flexure.

10. The drive assembly of claim 5 wherein said linkage assembly comprises a structure having a ply thickness ranging from about 13 μm to about 50 μm.

11. The drive assembly of claim 5 wherein said linkage assembly comprises a structure having a ply thickness ranging from about 18 μm to about 40 μm.

12. The drive assembly of claim 5 wherein said linkage assembly comprises a structure having a ply thickness ranging from about 22 μm to about 30 μm.

13. The drive assembly of claim 5 wherein said linkage assembly comprises a structure having a ply thickness ranging from about 24 μm to about 28 μm.

* * * * *